United States Patent [19]
Martin et al.

[11] Patent Number: 5,606,924
[45] Date of Patent: Mar. 4, 1997

[54] PROCESS FOR REGULATING INDIVIDUAL FACTORS OR ALL FACTORS INFLUENCING COMBUSTION ON A FURNACE GRATE

[75] Inventors: Johannes J. E. Martin, Seeshaupt; Franz Rampp; Joachim Horn, both of Munich, all of Germany

[73] Assignee: Martin GmbH fuer Umwelt- und Energietechnik, Munich, Germany

[21] Appl. No.: 365,466

[22] Filed: Dec. 28, 1994

[30] Foreign Application Priority Data

Dec. 29, 1993 [DE] Germany .................... 43 44 906.9

[51] Int. Cl.[6] ........................................... F23B 7/00
[52] U.S. Cl. .................. 110/341; 110/190; 110/101 CD; 110/101 C
[58] Field of Search ................................ 110/185, 186, 110/188, 101 C, 101 CF, 101 CD, 341, 190

[56] References Cited

U.S. PATENT DOCUMENTS

| | | | |
|---|---|---|---|
| 3,635,085 | 1/1972 | Shimotsuma et al. | 73/340 |
| 4,385,567 | 5/1983 | Voss | 110/186 |
| 4,676,734 | 6/1987 | Foley | 110/186 X |
| 5,043,735 | 8/1991 | Mawhinney et al. | 342/124 |
| 5,280,756 | 1/1994 | Labbe | 110/186 X |
| 5,398,623 | 3/1995 | Lautenschlager et al. | 110/186 X |

Primary Examiner—Henry A. Bennett
Assistant Examiner—Susanne C. Tinker
Attorney, Agent, or Firm—McAulay Fisher Nissen Goldberg & Kiel, LLP

[57] ABSTRACT

To carry out a process for regulating individual factors or all factors influencing combustion on a furnace grate, a radar device is provided primarily. This radar device serves to detect the three-dimensional distribution of the fuel mass on at least one preferred region of the grate. In addition, an infrared camera is provided for supplying information on the burn-up behavior of the fuel located on the grate. By using the measured quantities obtained from these two devices, control variables may be derived within a regulating unit for influencing the grate speed, the charging device, the amount and composition of supplied primary air, the amount and composition of supplied secondary air, the speed of the ash roller and the temperature of the air preheating device so that the furnace performance can be adapted to the steam output requirement. In addition to improving the fuel burn-up on the grate, it is also possible to influence the exhaust gas in an advantageous manner, for instance, with respect to the formation of unburned gas components and nitrogen oxides.

13 Claims, 5 Drawing Sheets

PROCESS FOR REGULATING INDIVIDUAL FACTORS OR ALL FACTORS INFLUENCING COMBUSTION ON A FURNACE GRATE

BACKGROUND OF THE INVENTION

1. Field of the Invention

The invention is directed to a process for regulating individual factors or all factors influencing combustion on a furnace grate.

2. Description of the Related Art

It is known from DE 38 25 931 C2 to regulate the firing capacity or furnace performance of incinerating installations by observing the burn-up behavior of the fuel on the firing grate via an infrared camera and regulating the air supply zonewise corresponding to the temperature distribution determined by the infrared camera. Although this regulating method resulted in considerable improvements over previous processes, it is still not satisfactory insofar as it enables only the temperature to be determined, but does not permit any conclusions to be reached concerning the amount of energy liberated by combustion in the individual zones. Accordingly, the furnace output or performance cannot be adapted with sufficient precision and speed to the steam output requirement.

In addition to this known method of regulating the combustion process based on determination of temperature in order to achieve a determined furnace performance, it is known to regulate the furnace performance as a function of the oxygen content detected in the flue gas or as a function of the generated mass flow of steam.

In all three regulating methods, there is a tendency to overcharge the grate when there is a drop in the thermal value of the fuel reaching the grate. For example, when there is an increase in the oxygen content of the exhaust gas, the regulating mechanism cannot determine whether this is a result of a decreasing thermal value or is caused by a decrease in the amount of fuel charged, so that the feed quantity is increased. When regulating on the basis of temperature and mass flow of steam, circumstances are such that when there is a decrease in the flue gas temperature and a reduction in the mass flow of steam the regulating device will likewise proceed on the assumption that the fuel mass located on the grate is insufficient and will increase the feed quantity. Since continuous detection of thermal values in refuse incineration plants is not possible, the grate will sometimes be overcharged due to the circumstances mentioned above.

OBJECT AND SUMMARY OF THE INVENTION

The primary object of the present invention is to provide a process for regulating individual factors or all factors influencing the combustion process in order to improve adaptation of the furnace performance to the steam output requirement. In this way, it is also possible to influence the composition of the exhaust gas, in particular with respect to nitrogen oxides and other pollutants.

According to the invention, this object is met in a process of the type mentioned above in that the three-dimensional distribution of the fuel mass is detected on at least one preferred region of the grate.

As a result of this step it is possible to draw conclusions about the energy released by combustion irrespective of the control variable used for regulating the combustion process, i.e., regardless of whether the combustion process is regulated as a function of the temperature of the flue gas, the oxygen composition of the flue gas or the mass flow of steam. Of course, the greater the region of the grate which is monitored with respect to the three-dimensional distribution of mass of the fuel, the greater the regulating accuracy. For instance, if only a very limited region is monitored with respect to the three-dimensional distribution of the fuel mass immediately after charging with fuel, the process according to the invention serves substantially as an "emergency brake" to prevent overcharging of the grate in the event of a drop in the thermal value, which necessarily leads to a reduction in furnace output. However, in the other extreme, when the entire grate is monitored and the three-dimensional distribution of mass is detected over the entire grate, it is possible to regulate the individual factors influencing the combustion process in such a way that the most uniform possible furnace performance can be adjusted in the transverse direction of the grate and the most ideal combustion process can be adjusted in the longitudinal direction of the grate. In this way, the necessary furnace performance can be adapted to the desired steam output in the most accurate possible manner.

An advantageous improvement in the process according to the invention is achieved by detecting the temperature distribution of the fuel mass located on the grate. That is, by determining the temperature distribution and the mass distribution, very precise conclusions can be drawn concerning the combustion process and, in particular, the locally released energy so as to enable appropriate regulating steps with respect to the factors influencing the combustion process.

The temperature distribution can be determined in an advantageous manner by means of at least one infrared camera directed on the fuel bed. An infrared camera, known per se, can serve to determine the burn-up behavior, i.e., primarily the radiation of the incandescent fuel mass, so that one of the essential components for assessing the combustion process can be obtained.

The three-dimensional distribution of mass of the fuel can be determined in an advantageous manner in that the fuel mass contour is scanned by radar. The fuel mass contour can be scanned in this way in a very exact manner by means of radar so that, together with the detection of the locally prevailing temperature of the fuel mass, the two essential components permitting an accurate assessment of the locally released energy can be obtained and suitable steps may be initiated for improving or damping the locally prevailing combustion process.

The three-dimensional fuel mass distribution can also be detected by directing a plurality of video cameras on the fuel mass at different angles.

The individual factors influencing the combustion process are air quantity, specifically the total amount of air fed to the combustion process; distribution of the supplied amount of air with respect to the proportion of primary air and secondary air; composition of the combustion air, whose oxygen content can be modified by mixing in oxygen or by returning flue gas; air preheating temperature; fuel feed quantity; feed quantity with respect to different longitudinal paths of the grate; stoking speed over the entire grate; local stoking speed of the grate; stoking speed of different grate paths; and operating speed of the ash discharge device provided at the end of the grate.

All of the factors in this list, which should not be considered exhaustive, can be optionally influenced individually or collectively by detection of the three-dimensional distribution of the fuel mass on at least a preferred region of the grate by detecting the three-dimensional distribution of the fuel mass and by detecting the temperature distribution. If a particularly high level of optimization is prohibited by reason of cost, detection of the three-dimensional distribution of the fuel mass should be given priority.

The invention is explained more fully in the following with reference to an example of a furnace installation shown in the drawing, a schematic diagram of the various reciprocally influencing factors, and a schematic example of the combination of different regulating variables.

DESCRIPTION OF THE PREFERRED EMBODIMENTS

Figure 1:
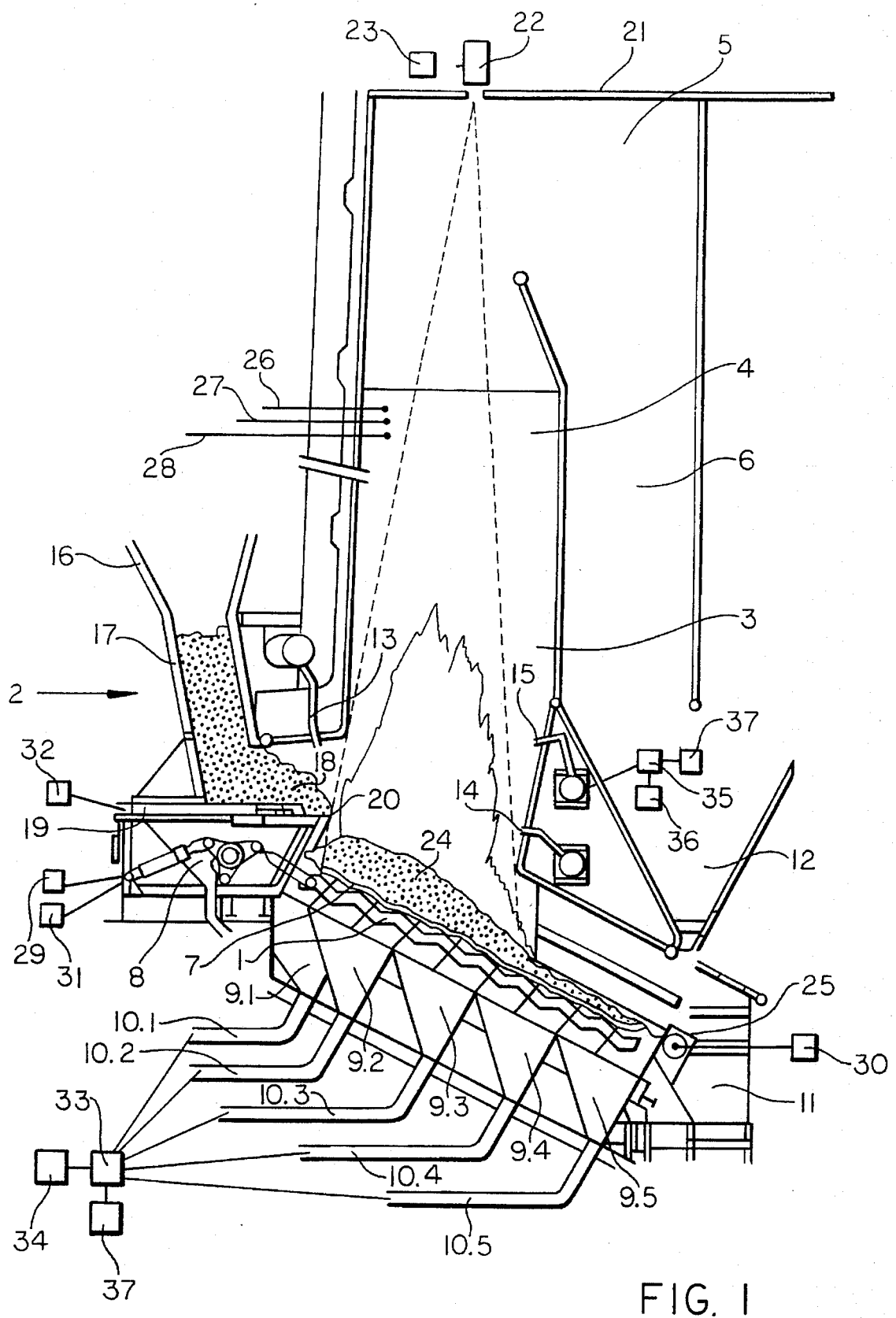
FIG. 1 shows a vertical section through a furnace installation shown schematically.

The furnace installation shown in FIG. 1 has a grate 1, a charging device 2, a combustion chamber 3 with adjoining gas flue 4, and a reversing chamber 5 in which the exhaust gases are guided into a downward gas flue 6 from which they proceed to the units conventionally arranged downstream of a furnace installation, in particular a steam generator and exhaust gas cleaning installations.

The grate 1 has individual grate steps 7 which are formed in turn by individual grate bars arranged adjacent to one another. Every second grate step of the grate, which is constructed as a reciprocating grate, is connected with a drive, designated in its entirety by 8, which allows adjustment of stoking speed. Provided below the grate 1 are under-draft chambers 9.1 to 9.5 which are divided in the longitudinal direction and in the transverse direction, primary air being admitted to the latter separately via individual lines 10.1 to 10.5. At the end of the grate, the burnt up ashes fall via an ash roller 25 into an ashpit 11 in which the heavier solids separated from the exhaust gas in the lower reversing chamber 12 are also discharged, as the case may be. A plurality of rows of secondary-air nozzles 13, 14 and 15 are directed into the combustion chamber 3 and provide for regulated combustion of the combustible gases and floating fuel components.

These rows of secondary-air nozzles can be regulated separately in view of the various conditions prevailing over the combustion space.

The charging device 2 has a charging hopper 16, a feed chute 17, a charging table 18 and one or more adjacent charging pistons 19 which may be regulated independently, as the case may be, and which push the refuse falling into the feed chute 17 over the charging edge 20 of the charging table 18 into the firing space on the grate 1.

A radar device 22 and an infrared camera 23 are mounted in the cover 21 closing the upper reversing chamber 5. The three-dimensional distribution of the fuel on the grate can be detected by the radar device, while the temperature distribution of the fuel mass burning up on the grate is recorded by the infrared camera 23. This refers to the temperature distribution of the fuel mass on the grate and not to that of the flue gases. Thus, the burn-up behavior of the fuel mass located on the grate can be detected by this infrared camera.

The fuel 24 charged on the grate is pre-dried by the under-draft zone 9.1 and is heated and ignited by the radiation prevailing in the combustion chamber. The main firing zone is located in the region of under-draft zones 9.2 and 9.3, while the developing ashes are burnt up in the region of under-draft zones 9.4 and 9.5 and reach the ashpit. The gases rising from the fuel bed still contain combustible components which are burned to completion by feeding air through the row of secondary-air nozzles 13 to 15. The feed quantity, the quantities of primary air in the individual zones and its composition with respect to oxygen content, as well as the quantities of secondary air and its composition with respect to oxygen content are regulated as a function of the burn-up behavior which depends on the thermal value of the fuel and is subject to sharp fluctuations in the case of refuse. The radar device 22 and infrared camera 23 are used to detect the required regulating variables. Of course, other measuring devices may be provided for detecting the oxygen content 27 in the exhaust gas, the temperature 26 in the exhaust gas and the carbon oxide content 28 in the exhaust gas in addition to other devices, e.g., for measuring the nitrogen oxide content. An additional measured value detector can also be provided for the grate bar temperature.

Various adjusting devices are indicated in schematic form in FIG. 1: a device 29 for influencing the grate speed; a device 30 for influencing the speed of the ash roller; a device 31 for influencing the grate speed with respect to different paths; a device 32 for adjusting the switch-on and switch-off times and speed of the charging pistons; a device 33 for feeding primary air; a device 34 for adjusting the oxygen content of the primary air; a device 35 for feeding secondary air; a device 36 for adjusting the oxygen content of the secondary air; and a device 37 for adjusting the temperature of the air preheater with respect to primary air and secondary air.

The process according to the invention is described in the following with reference to FIGS. 2 to 5.

Figure 2:
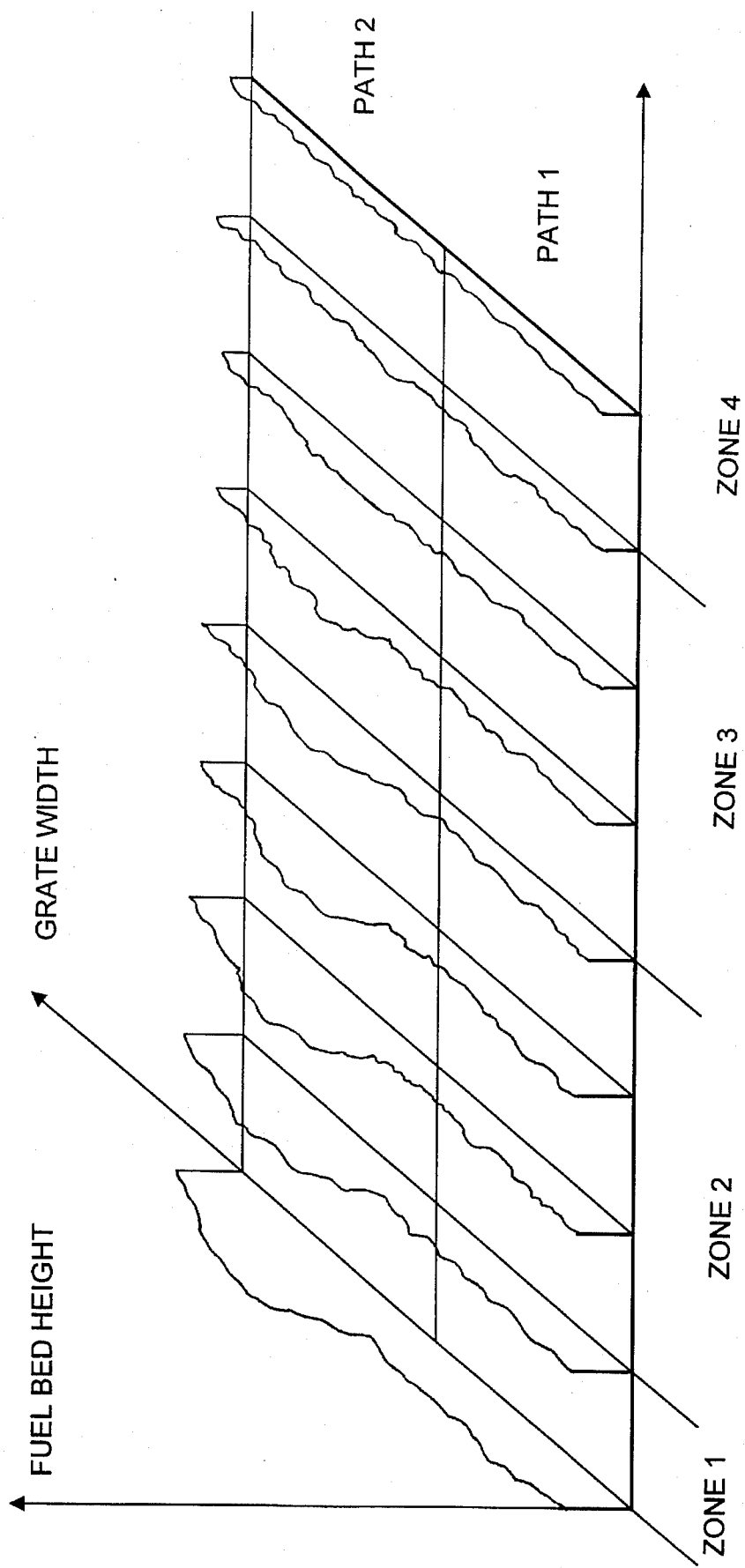
FIG. 2 is a diagram showing the fuel bed height with reference to the width and length of the firing grate.

Depending on its design, the radar device 22 can monitor either only the region associated with under-draft zone 9.2 or the entire grate region and can detect and record the three-dimensional mass distribution of the fuel as shown in FIG. 2. Assuming a suitable high-quality construction of the radar device 22, the three-dimensional distribution of the fuel mass can be detected, e.g., for four zones, and it may be determined, depending on the height of the fuel bed, whether or not the grate has been overcharged, particularly in the front zones of the grate. Of course, it is also possible to determine whether or not the fuel bed is lopsided as is shown, e.g., in FIG. 2 by the greater thickness of the fuel bed on path 2 of the grate compared to the thickness of the fuel on path 1 of the grate. The controlling variables for the stoking speeds of the grate, the different stoking speeds for path 1 and path 2, and the frequency or speed of the individual charging pistons 19 can be derived from these measured quantities, i.e., the fuel bed thickness, slope of the fuel bed and overcharging of the grate. Further, the speed of the ash roller, designated by 25 in FIG. 1, which provides for faster or slower discharge of ash depending on speed, can also be regulated. For example, if the thickness of the fuel mass along zones 1 to 4 with reference to FIG. 2 is too high as a whole, the stoking speed and the speed of the ash roller are increased in conjunction with additional steps, e.g., increasing the amount of primary air, in order to alleviate this overcharging of the grate. When the fuel bed is lopsided, as is shown in FIG. 2 by the higher accumulation on path 2 compared with path 1, the feed quantity for path 2 is reduced relative to the feed quantity for path 1. The fuel bed thickness measurement can be used by itself, especially when carried out only for the front grate region, to prevent an overcharging of the grate, since the charging device, stoking speed of the grate and rotating speed of the ash roller can be adjusted correspondingly when this controlling variable is obtained.

Figure 3:
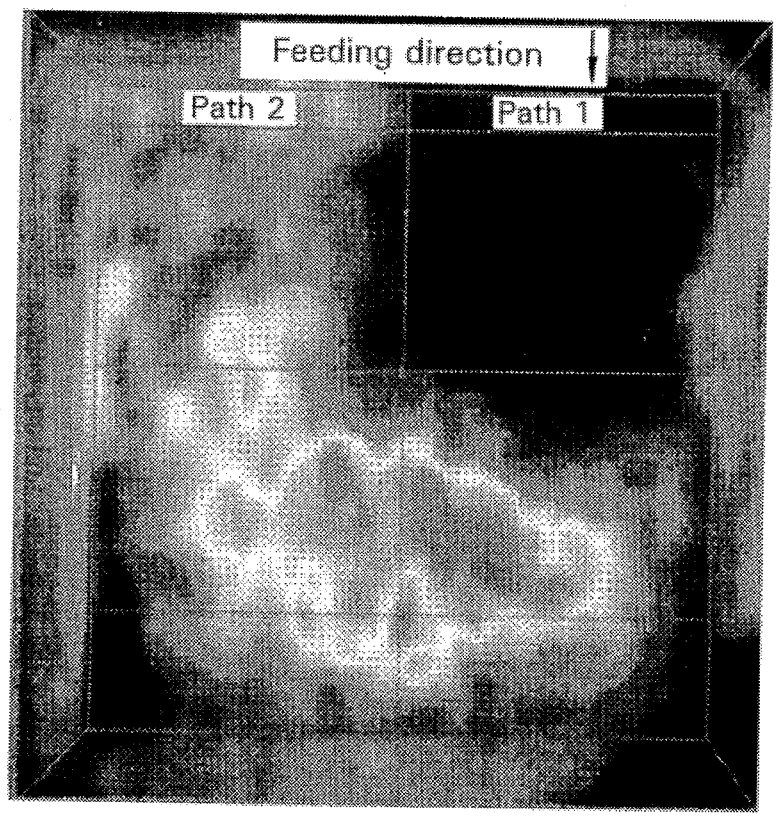
FIG. 3 is an instantaneous recording or snapshot made by an infrared camera showing the temperature distribution of the fuel bed.

An overview of the burn-up behavior according to FIG. 3 is obtained by means of the infrared camera 23. The brighter regions in FIG. 3 indicate a more intensive burn-up behavior than in the darker regions. The photograph made by the infrared camera 23 shown in FIG. 3 shows that there is a more intensive burn-up behavior on path 1. This may be explained, in combination with FIG. 2, by the lower height of the fuel bed on path 1. Accordingly, the obtained controlling variable calls for a reduced feed quantity on path 2 and for an increase with respect to the amount of primary air supplied and, as the case may be, also with respect to its oxygen content, in order to achieve good burn-up behavior on this path. By combining the data obtained with reference to FIGS. 2 and 3, conclusions may also be drawn regarding the moisture of the charged refuse; that is, if the radar measurement has determined a lower fuel bed height and the infrared camera has, at the same time, recorded a darker region in this location indicating poor burn-up behavior, this demonstrates that the burn-up behavior does not conform to the provided standard values in spite of the lower fuel bed height. Thus, it may be concluded that the refuse is moist or contains substantial noncombustible components. Burn-up behavior is dampened by noncombustible components in the refuse just as it is by a higher water content, since these components must be heated by the energy released from the combustible components.

By carrying out additional radar measurement, it is also possible to determine the dust concentration in the exhaust gas and the particle velocity, so that conclusions may be reached concerning the local flow velocity of the gases. In this way, an additional control variable can be obtained, if necessary, for influencing the supplied primary air and/or secondary air.

By combining the control variables obtained from the radar measurement with the monitoring carried out by the infrared camera, regulation can be carried out based on fuel bed height, i.e., the thickness of fuel in the individual zones 1 to 4, possible lopsidedness of the fuel bed, overcharging of the grate, moisture in the fed refuse, dust concentration and particle velocity in the exhaust gas in connection with the determined brightness values supplied by the infrared camera recording, feed quantity and distribution on the individual paths, grate speed, dwell time of the fuel on the grate derived from the combination of grate speed and ash roller speed, temperature of the supplied combustion air in the form of primary air and secondary air, excess air and composition of combustion air with respect to oxygen content, and distribution of supplied primary air and secondary air quantities along the length and width of the grate with respect to primary air and with respect to the secondary air distribution over the combustion chamber.

Additional possibilities for regulating are afforded by measuring the oxygen content in the exhaust gas, the temperature in the combustion chamber and the carbon oxide content in the exhaust gas. For instance, an increase in the oxygen content in the exhaust gas would lead primarily to the conclusion that a shift had taken place in the ratio of fuel to combustion air accordingly indicating a surplus of air. However, if the quantity of fuel is sufficient as determined by the radar measurement, this increased oxygen content could also indicate an insufficient proportion of combustible materials in the refuse. For instance, a reduced temperature in the combustion chamber could be caused by poor burn-up behavior due to overcharging and excessive moisture in the refuse. In order to obtain a more accurate diagnosis, the measured values obtained by the radar device can be compared with those of the infrared camera to reach the correct conclusions with regard to the appropriate regulating steps. Another example of a measured quantity for influencing the regulating process is grate bar temperature. For example, if the grate bar temperature increases beyond a permissible degree, the thickness height of the fuel on the grate undergoing intensive burn-up is either too low, resulting in direct thermal radiation on the grate bar, or the proportion of oxygen in the combustion air is too high, since this would cause a particularly strong stimulation of combustion. However, the feed could also be insufficient or the fuel located on the grate might not be adequately circulated. The true cause of this excessive grate bar temperature can be ascertained by means of the measured values obtained from the radar device and infrared camera, whereupon appropriate steps can be undertaken, e.g., reducing the supply of air, decreasing the oxygen content, increasing the feed quantity, reducing the stoking speed, etc.

An increase in the carbon oxide content in the exhaust gas, for instance, may have several causes which could not always be correctly classified by previous measuring methods. Increased carbon oxide content could be caused by inadequate supply of primary air, insufficient oxygen content in the primary air, overcharging the grate with fuel or excessive moisture in the fuel mass. By combining radar measurement with measurements taken by the infrared camera, the causes may be narrowed down considerably and the appropriate regulating steps can be initiated more effectively, since these two measuring possibilities can be employed to determine fuel bed height, dust concentration, particle speed and burn-up behavior so that these measured values can be used to determine whether or not the excessive carbon oxide content can be reduced again to the given reference value or desired value by increasing the primary air supply, increasing the oxygen content, reducing the feed quantity, etc.

Figure 4:
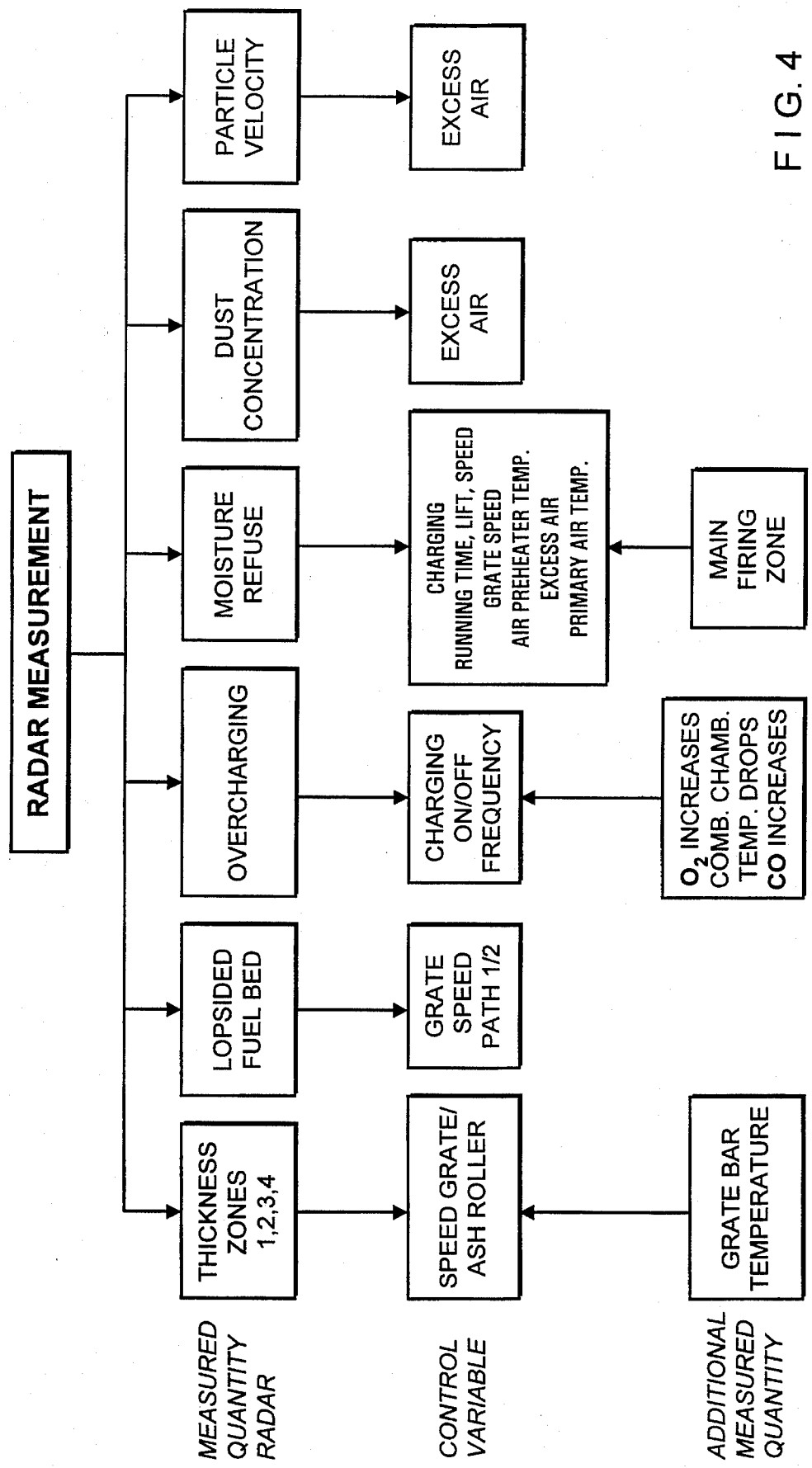
FIG. 4 shows a schematic diagram of the detection of measured quantities and their physical-technical dependency.
Figure 5:
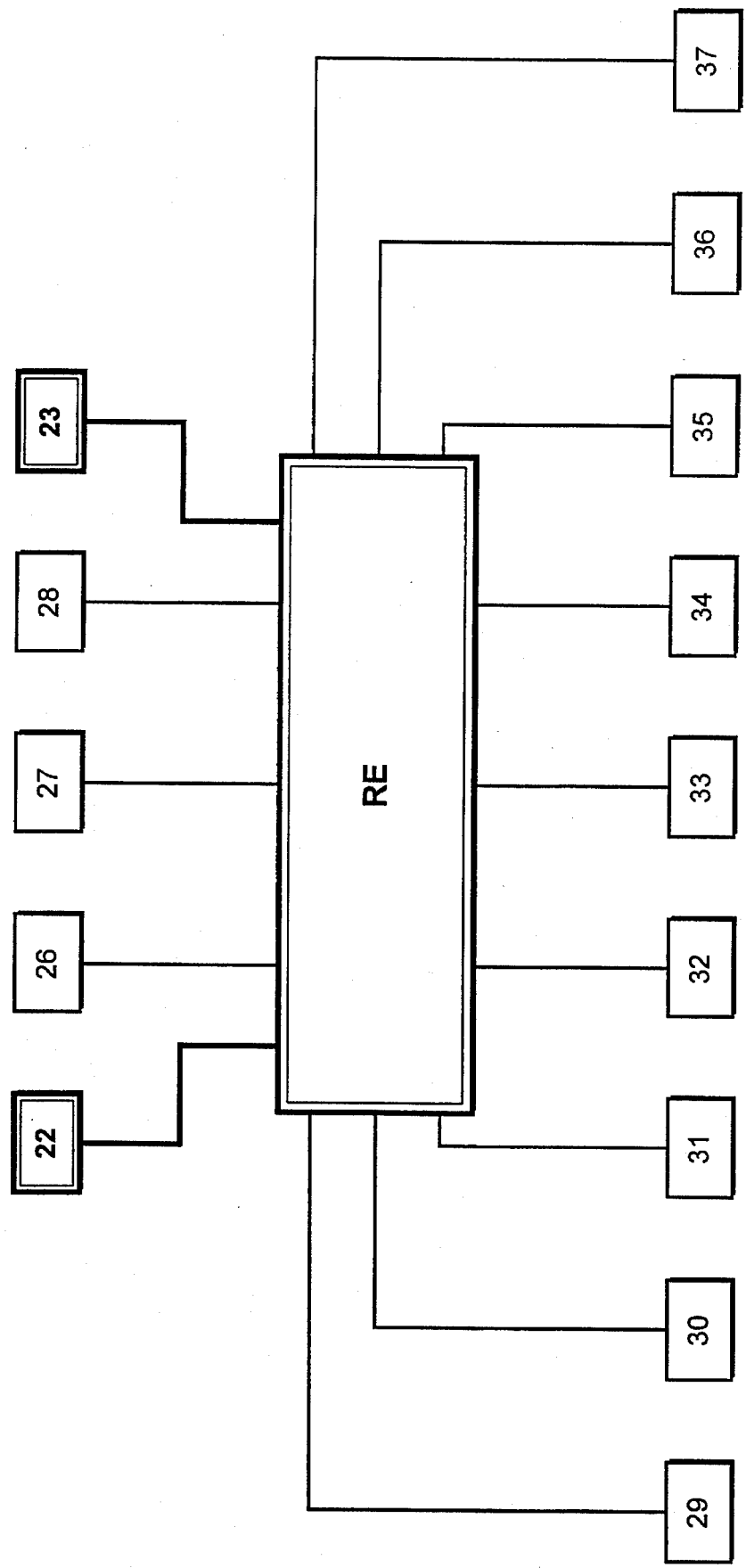
FIG. 5 shows a regulating diagram for a furnace installation.

While FIG. 4 shows the physical-technical relationships between the individual measurement variables and the opportunities which they provide for reaching conclusions with respect to controlling combustion in the furnace space, FIG. 5 shows the basic regulating diagram. According to this diagram, a regulating unit RE receives measured values from the radar device 22 and the infrared camera 23, evaluates these measured values and transmits appropriate controlling variables for the individual devices serving to influence the combustion process on the grate and accordingly to adapt the furnace performance to the steam output requirement.

As has already been explained in the preceding description, this regulating unit RE can also obtain additional measured values concerning the combustion chamber temperature 26, the oxygen content in the exhaust gas 27, and the carbon oxide content in the exhaust gas 28 in order to further refine the information obtained from the radar device 22 and infrared camera 23 with respect to the controlling variables to be conveyed.

As is shown in FIG. 5, the regulating unit RE can influence the adjusting devices for the grate speed 29, i.e., the stoking speed of the grate, the speed of the ash roller 30, the grate speed with respect to different paths 31, the switch-on and switch-off frequency or operating frequency of the charging pistons 32, the supply of primary air 33, the composition of the primary air with respect to oxygen content 34, the supply of secondary air 35, the composition of the secondary air with respect to oxygen content 36, and the temperature in the air preheater 37 for primary air and for secondary air.

While the foregoing description and drawings represent the preferred embodiments of the present invention, it will be obvious to those skilled in the art that various changes and modifications may be made therein without departing from the true spirit and scope of the present invention.

What is claimed is:

1. A process for regulating individual factors or all factors influencing combustion on a furnace grate, comprising:

detecting a three-dimensional distribution of fuel mass on at least a preferred region of a furnace grate, the detecting of said three-dimensional distribution including scanning a contour of said fuel mass by radar;

detecting a temperature distribution of said fuel mass, the detecting of said temperature distribution including operating at least one infrared camera directed towards said fuel mass; and in response to the detected three-dimensional distribution and the detected temperature distribution, regulating at least one factor influencing combustion on the furnace grate.

2. The process according to claim 1, wherein one of the factors to be regulated is the total amount of air supplied to the combustion process.

3. The process according to claim 1, wherein one of the factors is the distribution of supplied primary air.

4. The process according to claim 1, wherein one of the factors is the distribution of supplied secondary air.

5. The process according to claim 1, wherein one of the factors is the oxygen concentration in a primary air supply.

6. The process according to claim 1, wherein one of the factors is the oxygen concentration in a secondary air supply.

7. The process according to claim 1, wherein one of the factors is the temperature of preheated combustion air with respect to at least one of a primary air supply and a secondary air supply.

8. The process according to claim 1, wherein one of the factors is the amount of returned flue gas in at least one of a primary air supply and a secondary air supply.

9. The process according to claim 1, wherein one of the factors is the amount of fuel fed.

10. The process according to claim 1, wherein one of the factors is the amount of fuel fed with respect to different longitudinal paths on the grate.

11. The process according to claim 1, wherein one of the factors is a stoking speed over the entire grate.

12. The process according to claim 1, wherein one of the factors is a local stoking speed of the grate.

13. The process according to claim 1, wherein one of the factors is different stoking speeds of different grate paths.

\* \* \* \* \*